United States Patent Office 3,337,544
Patented Aug. 22, 1967

3,337,544
3,8-DIAZABICYCLOOCTANE DERIVATIVES OF PHENOTHIAZINES
Giorgio Cignarella, Milan, Italy, Emilio Testa, Tessin, Switzerland, and Giulio Maffii, Milan, Italy, assignors to Lepetit S.p.A., Milan, Italy
No Drawing. Filed Mar. 1, 1965, Ser. No. 436,339
Claims priority, application Great Britain, Mar. 18, 1964, 11,434/64
7 Claims. (Cl. 260—243)

This invention relates to new pharmacologically active compounds. More particularly, the invention is concerned with 3,8-diazabicyclooctane derivatives of phenothiazines of the generic formula

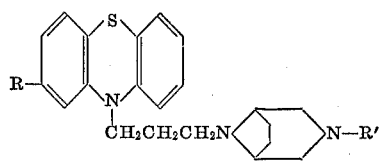

wherein R represents hydrogen, halogen, alkoxy or trihalomethyl and R' represents lower alkyl or hydroxylower alkyl.

It is the primary purpose of this invention to afford new and useful substances in which both a phenothiazine and a 3,8-diazabicyclo[3.2.1]octane ring is present.

Another purpose of the invention is to provide an efficient chemical process by which the above new compounds are prepared.

The therapeutic interest of the compounds herein disclosed is connected with their high activity as transquilizers. In this respect, some representatives of the class are markedly more active than the known tranquilizing agent, chlorpromazine, and show a generally lower degree of toxicity. For instance, 3-hydroxyethyl-8-[10-(2-chlorophenothiazinyl) - propyl]-3,8 - diazabicyclo[3.2.1]octane administered intraperitoneally at the dosage of 1.5 mg./kg. to rats, causes 50% inhibition of the pole climbing avoidance (C.R.), and at 2.5 mg./kg. the inhibition is quite complete. When administered orally the same compound shows an $ED_{50}$ of 2.5 mg./kg. This activity lasts a long time and can still be found after 6 hrs. from the administration of the drug. With mice it causes 50% decrease of curiosity and spontaneous activity at the dosage of 3 mg./kg. intraperitoneally.

A still higher activity is displayed by 3-hydroxyethyl-8-[10-(2-trichloromethylphenothiazinyl) - propyl]-3,8-diazabicyclo[3.2.1]octane, which causes the above illustrated 50% inhibition of avoidance at 0. mg./kg. The other representatives of the class all possess comparable activity. The $LD_{50}$ intraperitoneally in mice ranges between about 100 and 200 mg./kg., thus rendering the new class of compounds entirely safe for clinical use. As a further advantage, the new compounds show a very limited degree of side effects, such as the antihistamine activity, which is undesirable when a good tranquilizing agent is to be administered.

The process for preparing the compounds which form the subject of this application consists in refluxing for 5–15 hours nearly equimolecular amounts of a phenothiazine of the formula

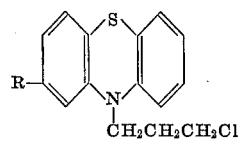

in which R has the significance above indicated, and a 3,8-diazabicyclooctane of the formula

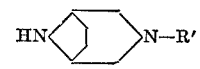

in which R' has also the significance indicated in the generic formula above, in the presence of about one equivalent amount of an alkalimetal hydroxide in an inert anhydrous organic solvent.

Obvious alternative routes for the preparation of the compounds are intended as falling within the purpose of this invention. For instance, it will be entirely obvious to all skilled in chemical preparation that the chloropropyl moiety may be attached to the 3,8-diazabicyclooctane, which is then refluxed under comparable conditions with a phenothiazine in which the ring nitrogen is unsubstituted. In this case it will be obvious to prepare first the sodium salt of the phenothiazine, f.i. by reaction with sodamide, and then to reflux the sodium salt with the chloropropyl diazabicyclooctane in an anhydrous inert organic solvent. For better illustration of such alternative way an example of the same is hereinafter given as Example 6.

The following are illustrative examples of the invention.

EXAMPLE 1

*3-hydroxyethyl-8-[10-(2-chlorophenothiazinyl)-propyl]-3,8-diazabicyclo-[3,2,1]-octane*

To 12 g. of 3-hydroxyethyl-3,8-diazabicyclo-[3,2,1]-octane in 200 ml. of anhydrous toluene and 12 g. of finely powdered NaOH, 23.6 g. of 2-chloro-10-(3-chloropropyl)-phenothiazine are added dropwise with stirring. The mixture is refluxed for 15 hours, cooled, filtered from inorganic salts and extracted with diluted hydrochloric acid. The hydrochloric layer is made alkaline with concentrated NaOH under cooling. The phenothiazine derivative is extracted with diethyl ether. The combined extracts are dried over $Na_2SO_4$, treated with charcoal and evaporated to dryness. The residue is treated with HCl to form the dihydrochloride; M.P. 205–8° C.

EXAMPLE 2

*3-methyl-8-[10-(2-chlorophenothiazinyl)-propyl]-3,8-diazabicyclooctane*

To 35 g. of finely powered NaOH, 40 g. of 3-methyl-3,8-diazabicyclo-[3,2,1]-octane in 400 ml. of anhydrous toluene, 88 g. of 2-chloro-10-(3-chloropropyl)-phenothiazine are added dropwise with stirring and the mixture is refluxed for 5 hours. After cooling and washing with water the organic solution is extracted with 10% HCl. The acidic water extracts made alkaline with NaOH under cooling are extracted with diethyl ether, treated with charcoal, dried over $Na_2SO_4$ and evaporated to dryness. The crude product is then treated with HCl to give the dihydrochloride; M.P. 232–4° C.

EXAMPLE 3

*3-methyl-8-[10-(2-methoxy-phenothiazinyl)-propyl]-3,8-diazabicyclo-[3,2,1]-octane*

To 32 g. of 3-methyl-diazabicyclo-[3,2,1]-octane and 32 g. of NaOH in 25 ml. anhydrous toluene, 70 g. of 2-methoxy - 10-(3-chloropropyl) - phenothiazine are added dropwise. The mixture is refluxed for 8 hours with stirring, then it is cooled, the inorganic salts are filtered off and the organic solution is extracted with diluted HCl. The extracts are made alkaline with NaOH and extracted with diethyl ether. The ether solution is treated with charcoal, dried over $Na_2SO_4$ and evaporated to dryness to give the product; M.P. 86–8° C.

EXAMPLE 4

*3-hydroxyethyl-8-[10-(2-trifluoromethylphenothiazinyl)-propyl]-3,8-diazabicyclo-[3,2,1]-octane*

To 20 g. of 3-hydroxyethyl-3,8-diazabicyclo-[3,2,1]-octane and 20 g. of NaOH in 250 ml. of anhydrous toluene, 52 g. of 2-trifluoromethyl-10-(3-chloropropyl)-phenothiazine in 250 ml. of anhydrous toluene are added. The mixture is refluxed with stirring for 15 hours. After filtration of the inorganic salts, the solution is extracted with diluted HCl and the extracts made alkaline with NaOH. Then the solution is extracted with diethyl ether and evaporated to dryness. Yield 31 g. The dihydrochloride melts at 222–4° C.

EXAMPLE 5

*3-hydroxyethyl-8-(10-phenothiazinylpropyl)-3,8-diazabicyclo[3,2,1]octane*

Prepared exactly as described in the preceding example, starting from the same diazabicyclooctane derivative and 10-(3-chloropropyl)-phenothiazine. Yield 68%. The dihydrochloride melts at 235–238° C.

EXAMPLE 6

*3-methyl-8-[10-(2-trifluoromethylphenothiazinyl)-propyl]-3,8-diazabicyclo-[3,2,1]-octane*

To 3.9 g. of NaNH$_2$ in 500 ml. anhydrous toluene 26.7 g. of 2-trifluoromethyl-phenothiazine are added. The mixture is refluxed for 3 hours with stirring and 18.7 g. of 3-methyl-8-(3-chloropropyl)-3,8 - diazabicyclo - [3,2,1]-octane in 150 ml. of anhydrous toluene added. Refluxing is continued for 6 hours, then the mixture is cooled, washed with water and extracted with diluted HCl. The aqueous acidic layer is made alkaline and extracted in turn with diethyl ether. The combined extracts are dried over Na$_2$SO$_4$, treated with charcoal and evaporated to dryness. The crude residue is then treated with a HCl saturated solution of diethyl ether giving the dihydrochloride; M.P. 240–3° C.

We claim:
1. 3-hydroxyethyl - 8 - [10-(2-chlorophenothiazinyl)-propyl]-3,8-diazabicyclo-[3,2,1]-octane.
2. 3-methyl-8-[10-(2-chlorophenothiazinyl) - propyl]-3,8-diazabicyclooctane.
3. 3-methyl-8-[10-(2-methoxy - phenothiazinyl) - propyl]-3,8-diazabicyclo-[3,2,1]-octane.
4. 3-hydroxyethyl-8-(10-phenothiazinylpropyl) - 3,8-diazabicyclo[3,2,1]-octane.
5. 3-methyl - 8-[10-(2-trifluoromethylphenothiazinyl)-propyl]-3,8-diazabicyclo-[3,2,1]-octane.
6. 3-hydroxyethyl-8-[10 - (2-trifluoromethylphenothiazinyl)-propyl]-3,8-diazabicyclo-[3,2,1]-octane.
7. A compound of the formula

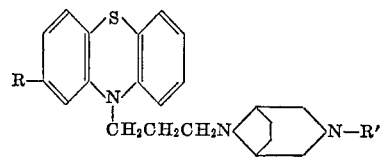

wherein R is a member of the class consisting of hydrogen, chlorine, alkoxy of 1 to 4 carbon atoms and trifluoromethyl, and R' is a member of the class consisting of lower alkyl and hydroxy-lower alkyl.

References Cited
UNITED STATES PATENTS
2,985,654   5/1961   Sherlock et al. _____ 260—243

OTHER REFERENCES
Anderson et al: Arzneimittel-Forschung, vol. 12, pp. 937–42 (1962).

WALTER A. MODANCE, *Primary Examiner.*
NORMAN A. MILESTONE, *Examiner.*
HARRY I. MOATZ, *Assistant Examiner.*